(12) United States Patent
Manieri et al.

(10) Patent No.: US 8,337,210 B2
(45) Date of Patent: Dec. 25, 2012

(54) BEHAVIOR MODIFICATION DEVICE AND METHOD

(76) Inventors: Tamara J. Manieri, Oakhurst, CA (US); William P. Manieri, Oakhurst, CA (US)

( * ) Notice: Subject to any disclaimer, the term of this patent is extended or adjusted under 35 U.S.C. 154(b) by 392 days.

(21) Appl. No.: 12/756,931

(22) Filed: Apr. 8, 2010

(65) Prior Publication Data

US 2011/0229866 A1    Sep. 22, 2011

(51) Int. Cl.
*G09B 19/00* (2006.01)

(52) U.S. Cl. ........................................... 434/236

(58) Field of Classification Search .................. 434/107, 434/110, 236–238, 365; 220/4.04, 4.07, 220/4.26, 4.27; 232/1 R, 4 R
See application file for complete search history.

(56) References Cited

U.S. PATENT DOCUMENTS

| | | | | |
|---|---|---|---|---|
| 3,035,355 A * | 5/1962 | Holmes | .......................... | 434/238 |
| 5,429,373 A * | 7/1995 | Chelko et al. | ................. | 273/440 |
| 5,470,235 A * | 11/1995 | Papaleo | .......................... | 434/238 |
| 5,573,407 A * | 11/1996 | Dunford | ........................ | 434/262 |
| 5,697,790 A * | 12/1997 | Garland et al. | ................ | 434/236 |
| 5,716,211 A * | 2/1998 | Vetter | ............................ | 434/107 |
| 6,273,027 B1 * | 8/2001 | Watson et al. | ................. | 119/712 |
| 6,722,886 B2 * | 4/2004 | Blumberg | ....................... | 434/236 |
| 7,326,059 B2 * | 2/2008 | Habing et al. | ................. | 434/236 |
| 7,347,693 B2 * | 3/2008 | Low et al. | ...................... | 434/236 |
| 2001/0034013 A1 * | 10/2001 | Bennett | ......................... | 434/238 |
| 2005/0045709 A1 * | 3/2005 | Beacham et al. | ............... | 232/10 |
| 2006/0172268 A1 * | 8/2006 | Thurman | ....................... | 434/236 |

* cited by examiner

*Primary Examiner* — Kurt Fernstrom
(74) *Attorney, Agent, or Firm* — Richard A. Ryan

(57) ABSTRACT

A behavior modification device and method for encouraging positive behavior and discouraging negative behavior by a child. The device comprises a positive section having a positive receptacle, a neutral section having two receptacles and a negative section having a negative receptacle. Each of the positive and negative sections are made up of members that disconnect to open the receptacles and which separate from the neutral section. Tokens and reward items are placed in the neutral section and a caregiver monitors the child. If good behavior is observed, a token is moved to the positive receptacle. If further good behavior is observed, a second token is moved to the positive receptacle and the child gets a reward item. If bad behavior is observed, a token is moved to the negative receptacle. If further bad behavior is observed, a second token is moved to the negative receptacle and the child is disciplined.

16 Claims, 5 Drawing Sheets

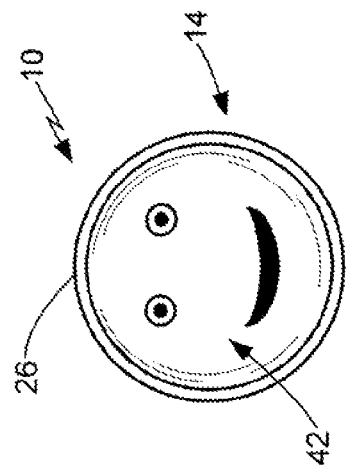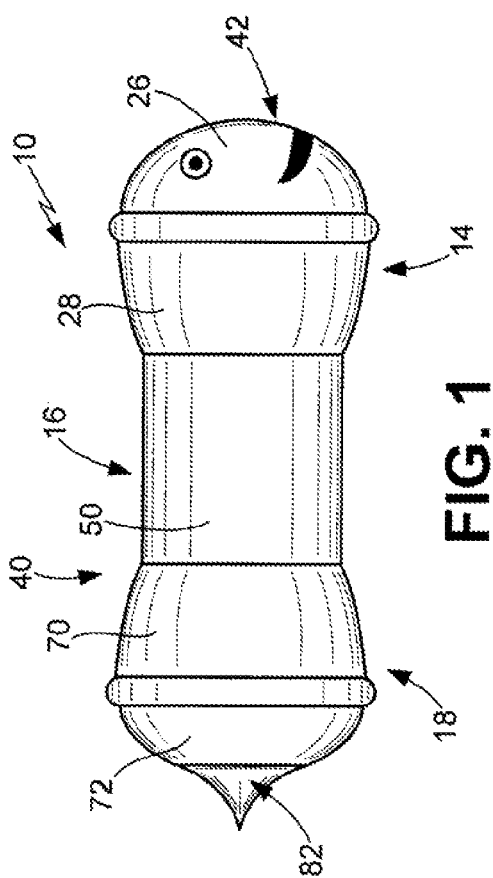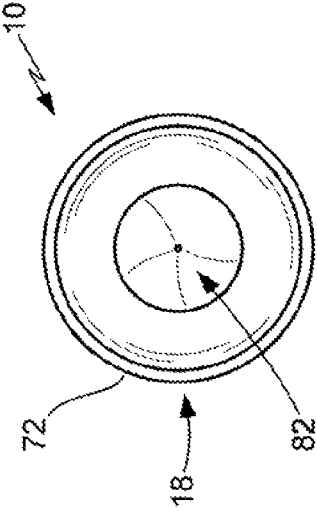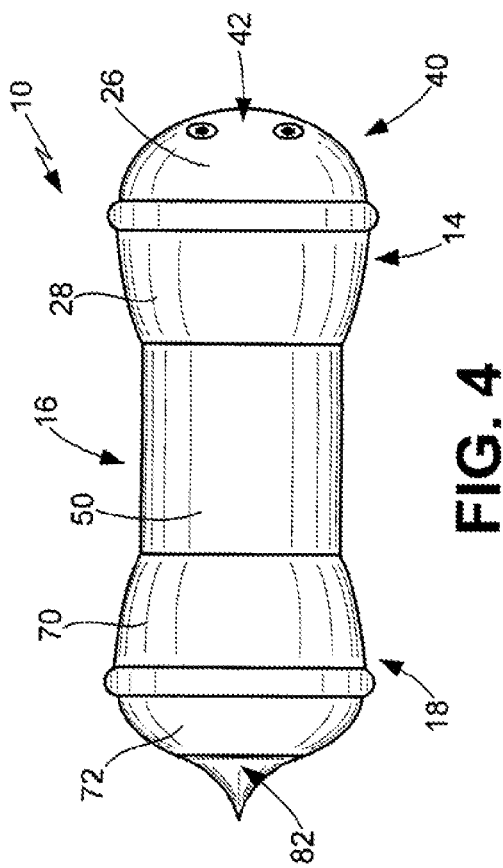

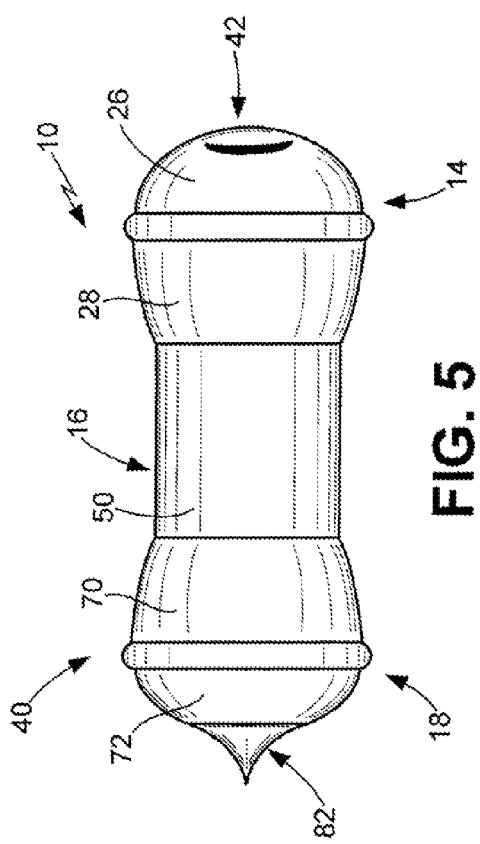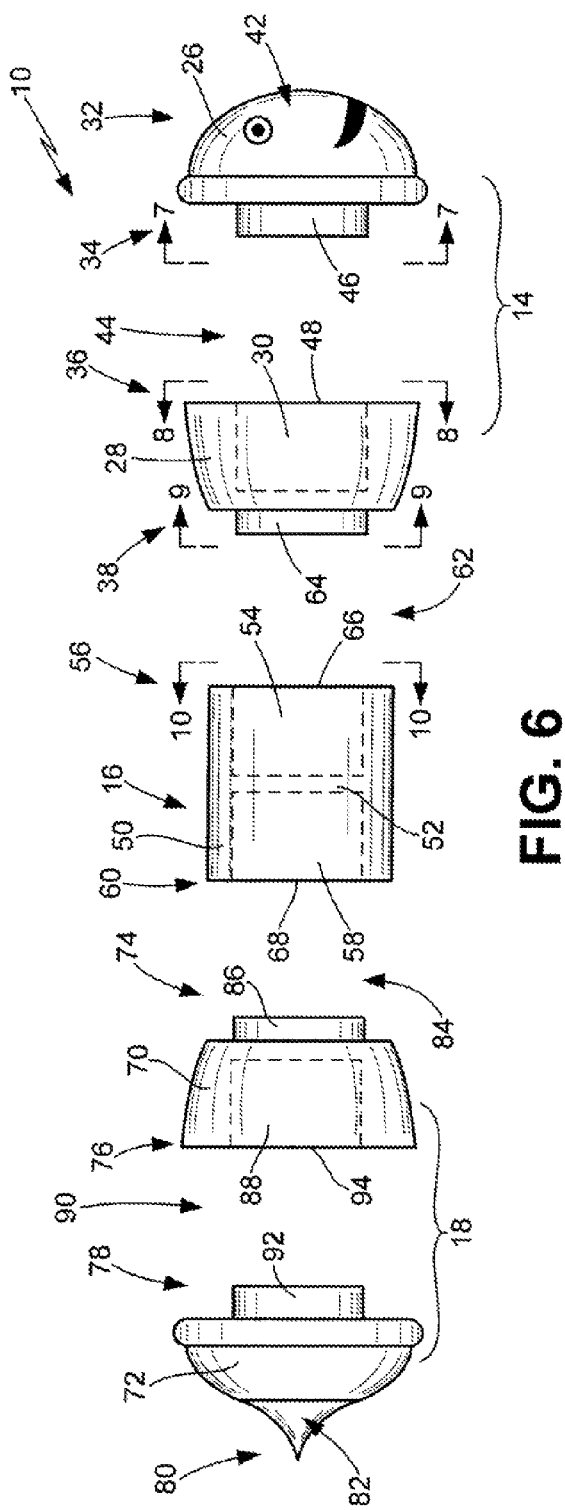

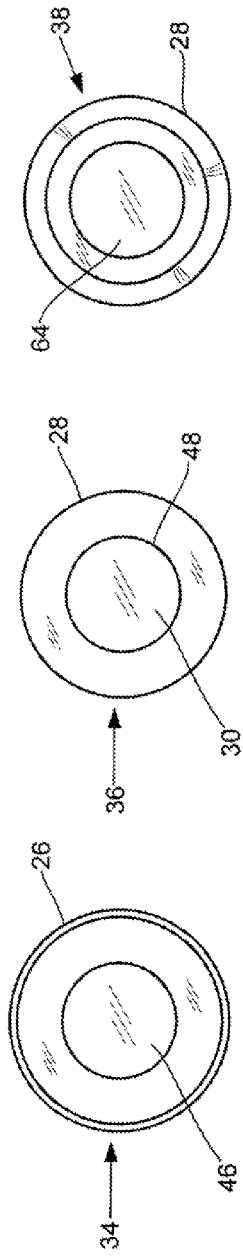
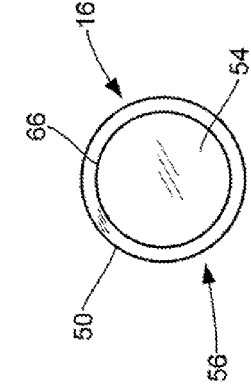
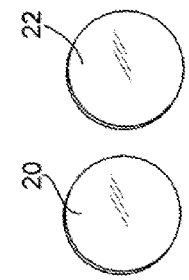
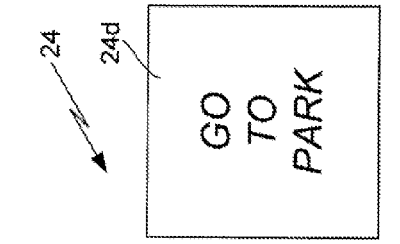

BEHAVIOR MODIFICATION DEVICE AND METHOD

CROSS-REFERENCE TO RELATED APPLICATIONS

This application is a claims priority to U.S. patent application Ser. No. 29/357,929 filed Mar. 19, 2010.

STATEMENT REGARDING FEDERALLY SPONSORED RESEARCH

Not Applicable.

REFERENCE TO A SEQUENCE LISTING, A TABLE OR A COMPUTER PROGRAM LISTING APPENDIX SUBMITTED ON A COMPACT DISC

Not Applicable.

BACKGROUND OF THE INVENTION

A. Field of the Invention

The field of the present invention relates generally to devices and methods for encouraging desirable behavior in particular subjects. Specifically, the present invention relates to such devices and methods that provide positive reinforcement in the form of rewards and the like for desirable behavior and loss of such rewards and other discipline to discourage inappropriate behavior. More specifically, the present invention relates to such devices and methods that are particularly beneficial for use with children.

B. Background

As is well known, modern society depends on persons exhibiting and engaging in behavior that is generally considered acceptable, such as behavior which is positive and/or beneficial to themselves or others, and not exhibiting or engaging in unacceptable behavior, such as that which is generally negative and/or harmful to themselves or others. One of the difficulties for any society is how to encourage people to engage in the desirable behavior and discourage people from engaging in undesirable behavior. Most professional behaviorists, psychiatrists and others who deal with such matters readily agree that the key to understanding the difference between acceptable and unacceptable behavior is primarily learned when a person is a child and that children who fail to learn this difference often grow up to have behavior problems as adults. Often, the adult behavior problems can be very serious, including crime.

Children are not born knowing what behavior is acceptable and what behavior is unacceptable. Instead, children must learn this information by being taught, whether directly or indirectly, by the actions and words of those who they interact with, including parents, teachers and other caregivers. Unfortunately, telling a child once that certain behavior is acceptable and/or that other behavior is not acceptable is usually insufficient to permanently establish in the mind of the child the differences between acceptable and unacceptable behavior. Those persons who deal with children readily appreciate that children primarily learn through repetitive enforcement of the tasks and information that it is desired they know. As such, the task of teaching children the difference between acceptable behavior and unacceptable behavior involves explaining to the child what he or she needs to do or avoid doing and then repeating that information and taking steps to either encourage or discourage repetition of that behavior. The ultimate desire is for the child to automatically or somewhat instinctively, meaning without any additional input on behalf of another person, choose to act in an acceptable manner.

Despite repeated attempts to teach acceptable behavior, realistically most children will still engage in unacceptable behavior at least now and then. As such, the person attempting to encourage acceptable behavior or discourage the unacceptable behavior will usually have to repeat himself or herself several times before the child understands the difference and begins to automatically act in an acceptable manner. The desire of every parent, teacher or other caregiver who deals with children is to accomplish this learning process as efficiently as possible and without an undue amount of aggravation and/or frustration on the part of the child and caregiver.

The primary process utilized to encourage acceptable behavior and discourage unacceptable behavior in a child is through reinforcement, which is providing stimulus to the child that strengthens or increases the probability of a specific response from the child. Research has identified four primary types of reinforcement, which are commonly referred to as positive, negative, punishment and extinction. Positive reinforcement is giving something to the child, such as a treat, gift, special event or other benefit, in response to the child having engaged in or performed a desired acceptable behavior in order to increase the probability that the child will repeat that behavior in the future. Negative reinforcement is the act of removing negative stimulus, such as nagging, complaining or the like, from the child to increase the probability that the child will repeat acceptable behavior in the future. Punishment is generally considered adding something adverse, which may be discipline in the form of spanking, additional chores, yelling or the like, to the child to decrease the likelihood the child will repeat unacceptable behavior in the future. Extinction involves removing something the child desires from access to the child, such as putting away a toy, forbidding a desert or the like, to decrease the likelihood the child will repeat unacceptable behavior in the future. Most caregivers, whether they know it or not, will utilize a mixture of these four types of reinforcement when trying to teach a child the differences between acceptable and unacceptable behavior. Unfortunately, as generally well known, the efforts by the caregiver to provide behavior reinforcement to a child are not always successful.

In general, one of the primary difficulties a caregiver has when trying to teach a child to engage in acceptable behavior and discourage the child from engaging in unacceptable behavior is the need to avoid causing further harm or complications which can blur the distinction for the child between acceptable and unacceptable behavior. As well known, many common methods of attempting to encourage acceptable behavior and discourage unacceptable behavior have significant limitations, including negative consequences, that can severely limit and even counteract attempts to teach a child acceptable and unacceptable behavior. For instance, many traditional forms of discipline, including spanking, yelling, withholding privileges and time-out, only act to stop (albeit often only on a temporary basis) unacceptable behavior and generally do not do much in the way of encouraging acceptable behavior. In addition, many of the forms of traditional discipline are well known to have negative side effects and even long term negative consequences. As an example, spanking and yelling as a means of discouraging unacceptable behavior have been found to only instill fear into the child and, if utilized often, lead to long lasting psychological problems, including the feelings of powerlessness and low self-esteem, while promoting violence and possibly encouraging aggressive behavior towards others. In addition to the potential for harm, spanking and yelling also fail to focus on teaching the child the proper behavior that is expected of him or her. Withholding privileges from a child is generally ineffective because there is usually a delay between when the child engaged in the unacceptable behavior and the negative consequence of that behavior, resulting in a disconnect for the child that substantially lessens the benefit of the attempted behavior correction. Although time-out is often effective at temporarily reducing or eliminating unacceptable behavior by removing the child from one location and placing him or her alone in another location, it does not recognize or emphasize the benefits of acceptable behavior.

Several devices and methods have been developed in an attempt to reinforce acceptable behavior and to discourage repetition of unacceptable behavior. For instance, U.S. Pat. No. 5,470,235 to Papaleo describes a child behavior improvement system comprising a thin, flat generally rectangular holder or support member having a plurality of receptacles thereon, a plurality of discs that each have a reward indicia written on the disc with at least one disc placed inside each of the receptacles and a removable cover over the opening to each receptacle that has a desirable behavior goal thereon. If the child engages in the desired behavior for a particular goal, then he or she gets to retrieve the reward disc from the appropriate receptacle and gets to have or do the reward. U.S. Pat. No. 5,697,790 to Garland, et al. describes a discipline method where a caregiver selects a plurality of tokens in response to a child misbehaving and instructs the child of a suitable phrase relating to the misbehavior from one of the tokens. The child then places the token into a container and repeats the token phrase to reinforce its importance. U.S. Pat. No. 7,347,693 to Low, et al. describes an apparatus and method for teaching and reinforcing positive behavior that comprises a token receiving and article dispensing apparatus that dispenses an article in response to a token being fed into the apparatus. The article is placed inside the apparatus on a shelf such that when a token, which is given to a person in response to good behavior, is fed through an inlet in front of the shelf the article is pushed off the shelf into a chute where it is dispensed to the person. U.S. Patent Publication No. 2007/0160965 to Habing, et al. discloses a child reward center comprising an apparatus containing a plurality of tokens and a release mechanism for releasing one of the tokens, which are released by a child as a reward for good behavior. The released token moves through a token routing path for the amusement of the child and then is collected in a reservoir. Once a predetermined number of tokens are collected in the reservoir, the child is awarded a prize, which may be dispensed by the apparatus.

The above patents and other prior art show that it is well known to provide an apparatus or device for rewarding or affecting good behavior and to utilize the apparatus/device as part of an associated method to reward good behavior of a child and to positively affect the child's future behavior. Although the above-described prior art may be able to beneficially impact or improve a child's behavior, certain limitations exist that have prevented wide acceptance of these apparatuses/devices and methods. One limitation is that the foregoing apparatuses/devices are not easily portable, which prevents the caregiver from being able to carry the apparatus/device with him or her so the caregiver can act in response to acceptable or unacceptable behavior any time and place it may occur. Another limitation is that at least some of the prior art apparatuses/devices and methods are complicated to set-up and/or use and are not configured to expressly discourage bad behavior.

What is needed, therefore, is an improved device and method for use by a caregiver to reward and encourage acceptable behavior by a child and to discourage unacceptable behavior by the child. The device should be sized and configured to be easily carried by the caregiver so that he or she may have it readily available when the caregiver observes good or bad behavior by the child. Preferably, the device and method should allow the child to easily visualize and understand how he or she is doing and provide the child with a goal that can be obtained as a result of good behavior. The device and method should allow the caregiver to easily and timely reinforce acceptable behavior and discourage unacceptable behavior in a fun, non-threatening manner. Preferably, the device should be configured to be interesting and fun for the child.

SUMMARY OF THE INVENTION

The behavior modification device and method of the present invention provides the benefits and solves the problems identified above. That is to say, the present invention discloses an improved behavior modification device and method which allows a caregiver to more easily and timely reward and encourage acceptable behavior by a child and to discipline and discourage unacceptable behavior by the child. In the preferred configuration, the device of the present invention is sized and configured to easily fit inside a caregiver's pocket, purse, briefcase or other case so the caregiver may have the device readily available when he or she observes good or bad behavior by the child. The device of the present invention is preferably configured to allow the child to easily understand and visualize the positive or negative effects of his or her good and bad behavior and to appreciate the objective to be obtained by continuing to engage in good behavior. The device and method of the present invention allows the child to readily grasp the caregiver's response to the child's acceptable or unacceptable behavior so that he or she may learn therefrom so as to increase the likelihood of continued good behavior and reduce the likelihood of repeating bad behavior. The device and method of the present invention allows a child's caregiver to encourage acceptable behavior and discourage unacceptable behavior in a fun and non-threatening manner. In the preferred embodiment, the device of the present invention is shaped to represent a bee so that the child may have positive feelings toward the caregiver's use of the device. Alternatively, the device may be provided in the shape of a bird, insect, animal or other creature.

In a primary embodiment of the device of the present invention, the behavior modification device comprises a positive section, a neutral section and a negative section and the device is utilized with two tokens and one or more reward items. The positive section has a first member and a second member, with the second member defining a positive receptacle at a first end thereof. An opening is associated with the positive receptacle and the positive receptacle is sized and configured to receive and hold the tokens therein. The first member has a rearwardly disposed insert member that is sized and configured to tightly engage the opening of the positive receptacle and enclose the tokens in the positive receptacle when the first member is connected to the second member, thereby forming the positive section. The neutral section has a third member that defines a first neutral receptacle at a first end thereof and a second neutral receptacle at a second end thereof. Each of the first and second neutral receptacles has an opening associated therewith and are sized and configured to receive and hold the tokens and/or one or more reward items therein. The first neutral receptacle is releasably closed by a rearwardly disposed insert member at the second end of the second member. The insert member at the second end of the second member is sized and configured to tightly engage the opening of the first neutral receptacle when the second end of the second member is connected to the first end of the third member. The negative section has a fourth member and a fifth member. The fourth member has a forwardly disposed insert member at a first end thereof that is sized and configured to tightly engage the opening of the second neutral receptacle and enclose the tokens and/or the reward items in the second neutral receptacle when the fourth member is connected to the third member. The fourth member defines a negative receptacle at a second end thereof with an opening being associated with the negative receptacle. The negative receptacle is sized and configured to receive and hold the tokens therein. The fifth member has a forwardly disposed insert member that is sized and configured to tightly engage the opening of the negative receptacle and enclose the tokens in the negative receptacle when the fifth member is connected to the fourth member. In a preferred embodiment, at least one of the first and second members is transparent and at least one of the fourth and fifth members is transparent so the caregiver and child can see the status of the tokens inside the positive receptacle and the negative receptacle. To make use of the device more fun and less threatening for the child, the behavior modification device is preferably at least generally configured as a character, which may be an insect, animal, reptile or a man-made object. In the preferred embodiment, the device is generally configured as a bee having a smiley face at a first end of the first member and a tail at a second end of the fifth member. Preferably, the device is sized and configured to be carried in a pocket of the caregiver or in his or her purse, briefcase or other carry case. In one embodiment, the device is approximately three to five inches long and has diameter, at its widest point, of one to two inches.

In a primary embodiment of the method of the present invention, the method generally comprises the steps of: (a) placing a first token, a second token and one or more reward items in one or more neutral receptacles of the neutral section of the device described above; (b) monitoring the behavior of the child by the caregiver having the device; (c) the caregiver observing positive or negative behavior by the child; (d) placing the first token in a positive receptacle of a positive section of the device upon observing positive behavior by the child and/or placing the first token in a negative receptacle of a negative section of the device upon observing negative behavior by the child; (e) continuing to monitor the behavior of the child by the caregiver; (f) placing the second token in the positive receptacle of the positive section of the device upon observing positive behavior by the child and/or placing the second token in the negative receptacle of the negative section of the device upon observing negative behavior by the child; and (g) providing the reward item to the child upon placement of the second token into the positive receptacle or discipline to the child upon placement of the second token into the negative receptacle. Typically, the caregiver will also verbally praise the child when giving him or her the reward item and verbally express disappointment with the child when providing the discipline.

Accordingly, the primary aspect of the present invention is to provide an improved behavior modification device and method that has the advantages discussed above and which overcomes the disadvantages and limitations associated with prior art behavior modification devices and methods.

It is an important aspect of the present invention to provide a behavior modification device and method that allows a caregiver to easily and timely reward and encourage acceptable behavior by a child and to punish and discourage unacceptable behavior by the child.

It is also an important aspect of the present invention to provide a behavior modification device and method that is configured to allow the child to easily understand and visualize the positive or negative effects of his or her good and bad behavior and to appreciate the objective that can be obtained by engaging in good behavior It is also an important aspect of the present invention to provide a behavior modification device that is sized and configured to be small enough for a child's caregiver to carry the device on his or her person or in a readily available purse, briefcase or other object so the caregiver may quickly respond when he or she observes acceptable or unacceptable behavior by the child.

It is also an important aspect of the present invention to provide a behavior modification method that is easy for the child to understand so that he or she may readily grasp the rewards and penalties for engaging in acceptable or unacceptable behavior.

Another important aspect of the present invention is to provide a behavior modification device and method that allows a child's caregiver to encourage acceptable behavior and discourage unacceptable behavior by the child in a generally fun and non-threatening manner.

Yet another important aspect of the present invention is to provide a behavior modification device that can be provided in the shape of a bee or in the shape of an insect, animal, person or other creature or object so the child will generally have positive feelings toward the caregiver's use of the device.

The above and other aspects and advantages of the present invention are explained in greater detail by reference to the attached figures and the description of the preferred embodiment which follows. As set forth herein, the present invention resides in the novel features of form, construction, mode of operation and combination of the above presently described and understood by the claims.

BRIEF DESCRIPTION OF THE DRAWINGS

In the drawings which illustrate the preferred embodiments and the best modes presently contemplated for carrying out the present invention:

FIG. 1 is a left side view of a behavior modification device configured according to a preferred embodiment of the present invention showing the device in the general shape of a smiley faced bee;

FIG. 2 is a front view of the device of FIG. 1;

FIG. 3 is a back view of the device of FIG. 1;

FIG. 4 is a top view of the device of FIG. 1;

FIG. 5 is a bottom view of the device of FIG. 1;

FIG. 6 is an exploded side view of the device of FIG. 1 showing the device disassembled into its five separate components, with the head or first member being the rightmost component and the tail or fifth member being the leftmost component and the chambers disposed inside the second, third and fourth members shown in dashed lines;

FIG. 7 is a back view of the first member of the device of FIG. 1 shown at lines 7-7 on FIG. 6, with the front view of the fifth member being the same;

FIG. 8 is a front view of the second member of the device of FIG. 1 shown at lines 8-8 on FIG. 6, with the back view of the fourth member being the same;

FIG. 9 is a back view of the second member of the device of FIG. 1 shown at lines 9-9 on FIG. 6, with the front view of the fourth member being the same;

FIG. 10 is a front view of the third member of the device of FIG. 1 shown at lines 10-10 on FIG. 6, with the rear view of the third member being the same;

FIG. 11 is a front perspective view of the tokens utilized with the preferred embodiment of the device and method of the present invention;

FIG. 12 are front views of various exemplary reward items that may be utilized with the device and method of the present invention;

DETAILED DESCRIPTION OF THE PREFERRED EMBODIMENTS

With reference to the figures where like elements have been given like numerical designations to facilitate the reader's understanding of the present invention, the preferred embodiments of the present invention are set forth below. The enclosed text and drawings are merely illustrative of one or more preferred embodiments and, as such, disclose one or more different ways of configuring the present invention. Although specific components, materials, configurations and uses are illustrated, it should be understood that a number of variations to the components and to the configuration of those components described herein and in the accompanying figures can be made without changing the scope and function of the invention set forth herein. For instance, although the figures and description provided herein show a certain shape and configuration for the device of the preferred embodiment, those skilled in the art will readily understand that this is merely for purposes of simplifying this disclosure and that the present invention is not so limited.

Figure 13:
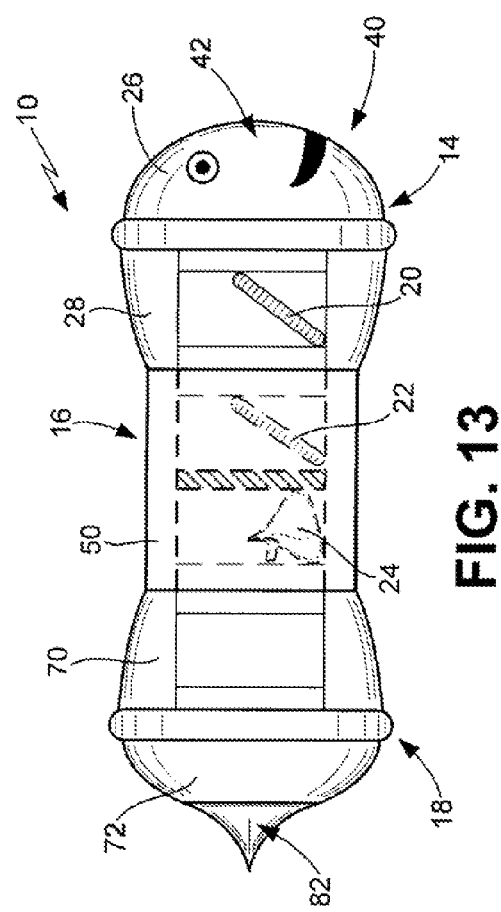
FIG. 13 is a side view of the behavior modification device of FIG. 1 showing a reward item and one token in the neutral section and a token in the positive section.

A behavior modification device that is configured pursuant to a preferred embodiment of the present invention is shown generally as 10 in FIGS. 1 through 6, 13 and 14. As set forth in more detail below, behavior modification device 10 is preferably utilized with the method 12, summarized in the flow chart shown on FIG. 15, to assist the caregiver with encouraging a child's acceptable behavior and to discourage unacceptable behavior by the child. As best shown in FIGS. 1 and 4 through 6, the device 10 generally comprises a first or positive section 14, a second or neutral section 16 and a third or negative section 18, the features and purposes of which are set forth below. Utilized with the device 10 are, in the preferred embodiment, a first token 20, a second token 22 and one or more reward items, such as candy 24a, gum 24b or other treat, money 24c, a note 24d for a special time or event or other reward as may be appropriate for and of interest to the child, which rewards are hereinafter collectively referred to as 24, as shown in FIGS. 11 and 12. As explained in more detail below and set forth in the flow chart summary of the method 12 of FIG. 15, the tokens 20/22 are used to indicate and track both acceptable behavior and unacceptable behavior of the child that is observed by the caregiver and the reward items 24 are utilized to reward the child for repeated acts of acceptable behavior. Initially, the two tokens 20/22 and one or more reward items 24 are placed in the neutral section 16 until the caregiver observes the child exhibiting one or more acts, statements or other events of acceptable behavior and/or unacceptable behavior. When the caregiver observes an event of acceptable behavior he or she will move the first token 20 to the positive section 14, as shown in FIG. 13. If the caregiver later observes a second event of acceptable behavior, then he or she will move the second token 22 to the positive section and the caregiver will praise the child and give him or her one of the reward items 24. The caregiver then repositions the two tokens 20/22 into the neutral section 16 to allow him or her to repeat the process.

If the caregiver observes an event of unacceptable behavior, then he or she will move the first token 20 to the negative section 18. Placement of one token 20/22 into the negative section 18 acts as a warning for the child that he or she is somewhat at risk for application of discipline. Preferably, the caregiver will also combine placement of the token 20/22 in the negative section 18 with an explanation of why the behavior is not acceptable and set forth the consequences of continued unacceptable behavior. If the caregiver observes a second event of unacceptable behavior, then he or she will move the second token 22 to the negative section 18. At this time, the caregiver will express disappointment with the child's unacceptable behavior and verbally state the type of discipline that will take place then or later as a result of the child's second act of unacceptable behavior. Examples of discipline include temporary loss of a toy or other favorite object, forbidding the child from watching of television or attending a desired event, assignment of a specific chore and the like, which will usually depend on the child and/or the type of unacceptable behavior. The caregiver will then move the two tokens 20/22 back to the neutral section 16 to allow him or her to repeat the process as necessary and/or desirable.

Figure 14:
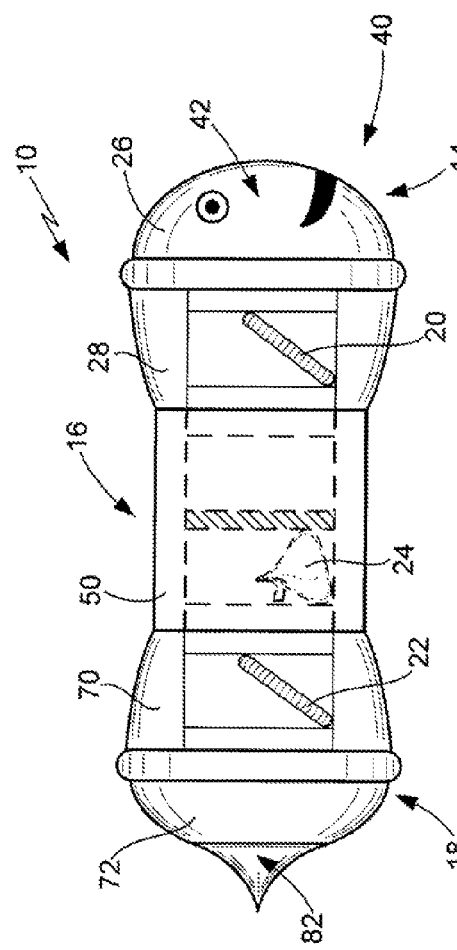
FIG. 14 is a side view of the behavior modification device of FIG. 1 showing a reward item in the neutral section, a token in the positive section and a token in the negative section.

In a preferred embodiment of the method 12 of the present invention, tokens 20/22 do not always have to be moved back to the neutral section 16 once they are placed in either the positive section 14 or the negative section 18. For example, a token 20/22 may be moved directly from the positive section 14 to the negative section 18, thereby bypassing the neutral section 16, if a token 20/22 is in the positive section 14 when the caregiver observes an event of unacceptable behavior. Alternatively, a token 20/22 may be moved directly from the negative section 18 to the positive section 14, again bypassing the neutral section 16, if a token 20/22 is in the negative section 18 when the caregiver observes an event of acceptable behavior. As stated above, movement of a token 20/22 to the positive section 14 should be accompanied by verbal praise and/or physical contact (such as a hug or the like) by the caregiver to reinforce the desired acceptable behavior to the child and movement of a token 20/22 to the negative section 18 should be accompanied by a statement of disappointment and/or explanation to the child of why his or her behavior is not acceptable. There may be times when there is one of the tokens 20/22 in each of the positive 14 and negative 18 sections, as shown in FIG. 14.

As best shown in FIGS. 6 through 10, the positive 14, neutral 16 and negative 18 sections comprise various receptacles that sized and configured to receive and hold the tokens 20/22 and one or more reward items 24. Each of the positive 14 and negative 18 sections comprise multiple members that are joined together with the one-piece neutral section 16 to form the desired device 10 that can be carried and used by a caregiver to encourage acceptable behavior and to discourage unacceptable behavior. In the preferred embodiment, the positive section 14 is made up of a first or head member 26 and a second or chamber member 28 that are removably joined together to secure one or more of tokens 20/22 inside the positive receptacle 30 in the second/chamber member 28. As shown in FIG. 6, the first member 26 has a first end 32 and a second end 34 and the second member 28 has a first end 36 and a second end 38. In the preferred embodiment, the device 10 is in the shape of a character 40, such as the bee best shown in FIGS. 1, 4 and 5, and the first end 32 of the first member 26 has a smile face 42 or the like to make the device 10 more acceptable and enjoyable to the child. The first 26 and second 28 members are provided with a first means for releasably connecting, shown generally as 44 in FIG. 6, the second end 34 of the first member 26 to the first end 36 of the second member 28. Preferably, the first connecting means 44 is configured to secure one or more of the tokens 20/22 inside the positive receptacle 30, as shown in FIG. 13. As will be readily appreciated by those skilled in the art, various connecting mechanisms can be utilized as the first connecting means 44 to releasably connect the first member 26 to the second member 28. In a preferred embodiment, the two components are configured for a press fit type of connection with the second end 34 of the first member 26 having a rearwardly projecting insert member 46 sized and configured to be tightly received in the opening 48 of the positive receptacle 30 at the first end 36 of the second member 28, as best shown in FIGS. 6 through 8. The insert member 46 should also be sized so as to not substantially fill the positive receptacle 30 of the second member 28 to provide sufficient space for one or more tokens 20/22, as shown in FIG. 13. Alternatively, the first connecting means 44 can comprise a screw-type threaded connection, interconnecting projections or tabs similar to some medicine bottles or wide variety of other types of connectors.

The neutral section 16 comprises a generally tubular third member 50 that defines at least one neutral receptacle sized and configured to receive and hold the tokens 20/22 and one or more reward items 24. In the preferred embodiment, as shown in FIG. 6, the third member 50 has a dividing wall 52 that provides a first neutral receptacle 54 toward the first end 56 of third member 50 and a second neutral receptacle 58 toward the second end 60 of third member 50 that are each sized and configured to receive at least one of the tokens 20/22 and the reward items 24, as shown in FIGS. 13 and 14. A second connecting means, shown generally as 62, releasably connects the positive section 14 to the neutral section 16. As above, in the preferred embodiment the two components are configured for a press fit type of connection with the second end 38 of the second member 28 having a rearwardly projecting insert member 64 that is sized and configured to be tightly received in the opening 66 into the first neutral receptacle at the first end 56 of the third member 50, as shown in FIGS. 6, 9 and 10. The insert member 64 should also be sized so as to not substantially fill the first neutral receptacle 54 of the third member 50 to provide sufficient space for one or more tokens 20/22, as shown in FIG. 13, or the reward items 24. The second end 60 of third member 50 has an opening 68 into the second neutral receptacle 58 that is used to releasably join the neutral section 16 to the negative section 14, as described below.

In the preferred embodiment, the negative section 18 is made up of a fourth or chamber member 70 and a fifth or tail member 72 that are removably joined together to secure one or more of tokens 20/22 inside negative receptacle 88 in the fourth/chamber member 70. As shown in FIG. 6, the fourth member 70 has a first end 74 and a second end 76 and the fifth member 72 has a first end 78 and a second end 80. As stated above, in the preferred embodiment device 10 is in the shape of a character 40, such as the bee best shown in FIGS. 1, 4 and 5, and the second end 32 of the fifth member 72 has a tail 82 or the like to make the device 10 more acceptable and enjoyable to the child. The fourth 70 and second 72 members are provided with a third means for releasably connecting, shown generally as 84 in FIG. 6, the second end 60 of the third member 50 to the first end 74 of the fourth member 70. Preferably, the third connecting means 84 is configured to secure one or more tokens 20/22 or one or more reward items 24 inside the second neutral receptacle 58, as shown in FIGS. 13 and 14. As set forth above, various connecting mechanisms can be utilized as third connecting means 84 to releasably connect the third member 50 to the fourth member 70 (and, therefore, the neutral section 16 to the negative section 18). In a preferred embodiment, the two components are configured for a press fit type of connection with the first end 74 of the fourth member 70 having a forwardly projecting insert member 86 sized and configured to be tightly received in the opening 68 of the second neutral receptacle 58 at the second end 60 of the third member 50, as best shown in FIG. 6. As above, the insert member 86 should be sized so as to not substantially fill the second neutral receptacle 58 of the third member 50 to provide sufficient space for one or more tokens 20/22 or one or more reward items 24, as shown in FIGS. 13 and 14. Alternatively, as will be readily apparent to those skilled in the art, the third connecting means 84 can comprise a screw-type threaded connection, interconnecting projections or tabs similar to some medicine bottles or wide variety of other types of connectors.

As set forth above, the fourth member 70 has negative receptacle 88 therein for receiving one or more tokens 20/22 when the caregiver observes the child engaging in unacceptable behavior, as shown in FIG. 14. The fourth 70 and fifth 72 members are provided with a fourth means for releasably connecting, shown generally as 90 in FIG. 6, the second end 76 of the fourth member 70 to the first end 78 of the fifth member 72. Preferably, the fourth connecting means 90 is configured to secure one or more of the tokens 20/22 inside the negative receptacle 88, as shown in FIG. 14. As will be readily appreciated by those skilled in the art, various connecting mechanisms can be utilized as the fourth connecting means 88 to releasably connect the fourth member 70 to the fifth member 72. In a preferred embodiment, the two components are configured for a press fit type of connection with the first end 78 of the fifth member 72 having a forwardly projecting insert member 92 sized and configured to be tightly received in the opening 94 of the negative receptacle 88 at the second end 76 of the fourth member 70, as best shown in FIG. 6. As set forth above, the insert member 92 should be sized so as to not substantially fill the negative receptacle 88 of the fourth member 70 to provide sufficient space for one or more tokens 20/22, as shown in FIG. 14. Alternatively, the fourth connecting means 90 can comprise a screw-type threaded connection, interconnecting projections or tabs similar to some medicine bottles or wide variety of other types of connectors.

As set forth above and shown in FIG. 6, in the preferred embodiment of the device 10 of the present invention each of the connecting means, namely the first 44, second 62, third 84 and fourth 90 connecting means, are the same from one pair of members to another. Each of these connecting means utilizes a press fit type of connection having an insert member that engages its respective adjacent member by fitting tightly inside the opening of a the adjacent member's receptacle. Once inserted, the member having the insert member sufficiently closes the respective receptacle such that the receptacle cannot be opened by mere inadvertent contact, which could result in loss of the contents (namely, tokens 20/22 and/or reward items 24) therefrom. In the preferred embodiment, the caregiver must apply sufficient force to pull apart to members and disengage the insert member from its respective receptacle and apply sufficient force to press the insert member back through the opening of the respective receptacle to engagedly connect the two adjacent members (i.e., first member 26 to second member 28, second member 28 to third member 50, third member 50 to fourth member 70 and fourth member 70 to fifth member 72) in substantially abutting relation. The first 44, second 62, third 84 and fourth 90 connecting means should be configured to engagedly connect the respective members together. In an alternative embodiment, not shown, the first 44, second 62, third 84 and fourth 90 connecting means do not have to be the same. For instance, one or more of these connecting means can comprise a threaded or twist-on/off connection and one or more of the other connecting means can comprise the press fit connection described above. If desired, each of the connecting means, namely each of the first 44, second 62, third 84 and fourth 90 connecting means, are different from each other. However, it is anticipated that caregivers will generally prefer the first 44, second 62, third 84 and fourth 90 connecting means being the same. In addition, it is also anticipated that the manufacturing costs will be much less to make each of the connecting means the same.

In the preferred embodiment, one or more of the components are transparent so the caregiver and the child can see inside the component to visualize the position of the tokens 20/22 and the type of reward 24. In a preferred embodiment, shown in FIGS. 13 and 14, the second member 28 and the fourth member 70 are transparent or at least substantially transparent so the tokens 20/22 placed therein can be easily seen by the caregiver and child and the third member 50, which comprises the neutral section 16, is substantially opaque to keep the identity of the reward item 24 a mystery to the child until he or she exhibits the desired number acceptable behavior events. In another preferred embodiment, the second member 28 and the fourth member 70 are either completely or partially opaque and the first 26 and fifth 72 members are transparent to allow the caregiver and child to see the tokens 24 inside the positive receptacle 30 and the negative receptacle 88, respectively. If desired, each of the first 26, second 28, fourth 70 and fifth 72 members, making up the positive section 14 and the negative section 16, can be transparent to make it easier for the caregiver and child to see the tokens 20/22 inside the positive receptacle 30 and negative receptacle 88. Additionally, if desired, the third member 50 or neutral section 16 can also be transparent, resulting in a device 10 having a body that is transparent from the smiley face 42 to the tail 82.

The tokens 20/22 are sized and configured to fit within the positive receptacle 30, the first neutral receptacle 54, the second neutral receptacle 58 and the negative receptacle 88 and the reward items are selected so as to fit inside the first neutral receptacle 54 and/or the second neutral receptacle 58, as shown in FIGS. 13 and 14. In the preferred embodiment, shown in the figures, the tokens 20/22 have a shape that is in corresponding relation to the shape of the various receptacles (i.e., 30, 54, 58 and 88). Alternatively, the tokens 20/22 and receptacles can be of different shapes. In a preferred embodiment, the tokens 20/22 are made out a material, such as colored plastic, metal or the like, that allows the caregiver and child to easily see the tokens 20/22 inside the receptacles 30, 54, 58 and 88 so the status of the reward/discipline feature of the present invention can be easily monitored by the caregiver and child.

As will be readily apparent to those skilled in the art, the device 10 of the present invention can be manufactured from a wide variety of materials and made in a wide variety of shapes. Although the various members 26, 28, 50, 70 and 72 are shown as having a generally round cross-section, they can be made in a wide variety of different cross-sections, including square, rectangle, triangle, oval or the like. In a preferred embodiment, the device 10 is made out of plastic of the type that is not easily broken or damaged by contact against a hard surface or other object, including the ground, in case the caregiver or the child drops the device 10 or otherwise hits it against the hard surface. As stated above, device 10 is preferably made in a size and configured to fit in the caregiver's pocket or in his or her purse, briefcase or other carrying case so the device 10 will be easy to carry. Being easy to carry will allow the caregiver to have the device 10 with him or her at all times, in contrast to prior art apparatuses/devices, so that he or she may respond appropriately when the child acts in an acceptable or unacceptable manner. In one embodiment, the device 10 is approximately three to five inches long and has a diameter of approximately one to two inches.

The device 10 of the present invention can be in a generally plain cylindrical, square, rectangular, triangular or other shape having the various members described above, namely first 26, second 28, fourth 70 and fifth 72 members. As set forth above and shown in the figures, however, in the preferred embodiment the device 10 is in the shape of a character 40 so it may more interesting and less threatening to the child. In a preferred embodiment, the character 44 is a bee or bee-like object. Alternatively, the character 44 can be a wide range of different objects, including insects, animals, birds or various man-made objects (e.g., a rocket or a rocket-like object). Different types of character 44 may be used as being more appealing to child depending on his or her age, maturity, interests or gender.

Figure 15:
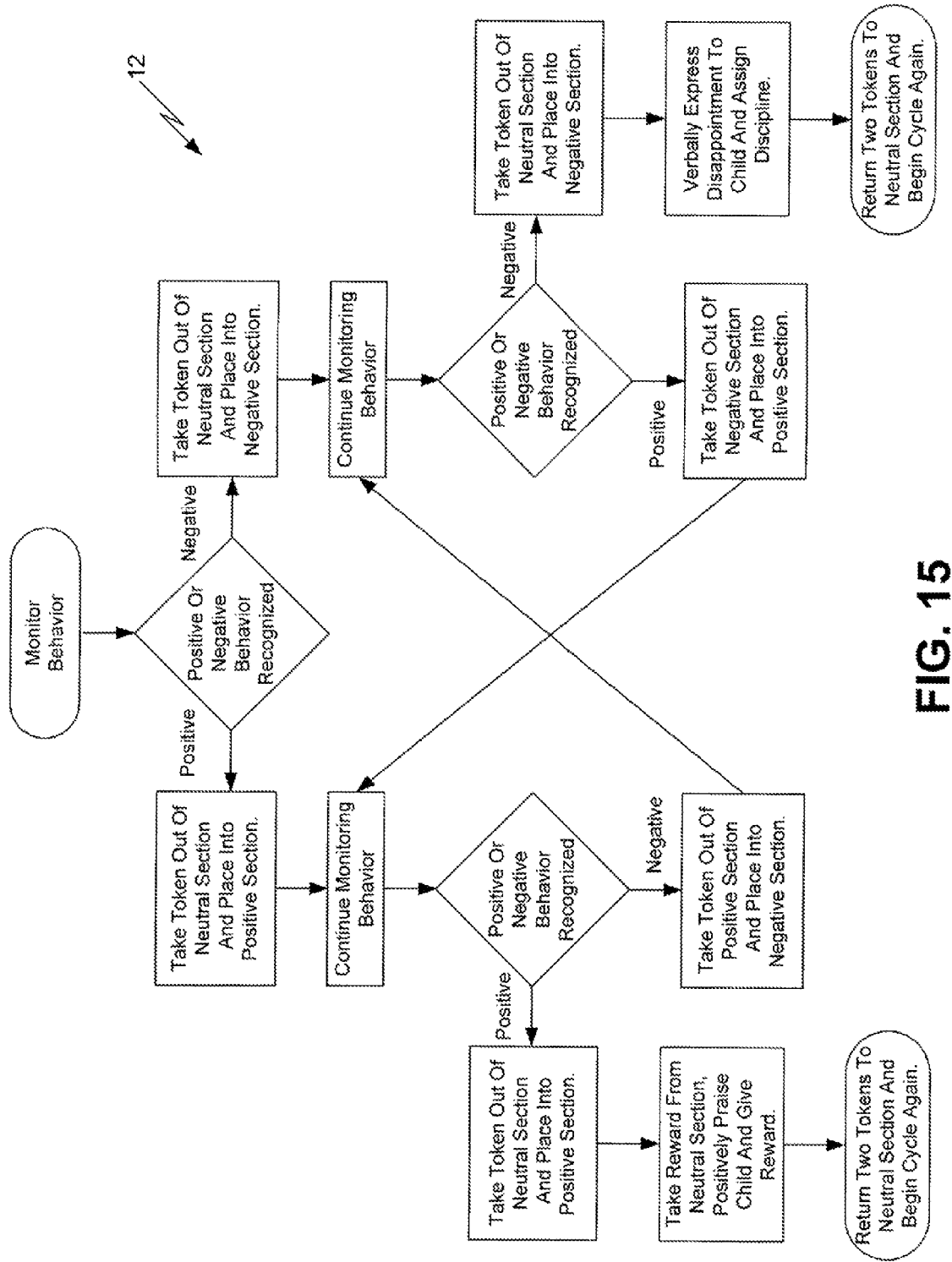
FIG. 15 is a flow chart illustrating a preferred embodiment of the method of the present invention.

As summarized in the flow chart of the method 12 shown in FIG. 15, the tokens 20/22 are used to indicate and track both acceptable behavior and unacceptable behavior of the child that is observed by the caregiver and the reward items 24 are utilized to reward the child for repeated acts of acceptable behavior. Initially, the tokens 20/22 and one or more reward items 24 are placed in the first neutral receptacle 54 and second neutral receptacle 58 of the third member 50 comprising the neutral section 16. Typically, the tokens 20/22 are placed in one of the first 54 and second 58 neutral receptacle and the one or more reward items 24 are placed in the other of the first 54 and second 58 neutral sections. The caregiver then observes the child and monitors the child's behavior until he or she recognizes the child exhibiting one or more acts, statements or other events of positive/acceptable behavior and/or negative/unacceptable behavior. Depending on whether the behavior is positive or negative, the caregiver takes different action with regard to the tokens 20/22. If the behavior is positive, the caregiver will move the first token 20 from the neutral section 16 to the positive receptacle 30 in the second member 28 of positive section 14, as shown in FIG. 13. The caregiver continues to monitor the child's behavior. If the caregiver later observes a second event of acceptable behavior, then he or she will move the second token 22 from neutral section 16 to the positive receptacle 30 in the second member 28 of positive section 14 and the caregiver take at least one of the reward items 24 from the neutral section 16, positively praise the child and give him or her the reward item 24. The caregiver then repositions the two tokens 20/22 into one of the first neutral receptacle 54 and the second neutral receptacle 58 of the third member 50 of the neutral section 16 to allow him or her to begin the cycle again. If while the caregiver is continuing to monitor the child with the first token 20 in the positive receptacle 30 the child exhibits an event of unacceptable behavior, then the caregiver will take the token 20 out of the positive receptacle 30 of positive section 14 and place it into the negative receptacle 88 of the negative section 18, as shown on FIG. 15.

If while monitoring the child the caregiver first observes an event of negative/unacceptable behavior, then he or she will move the first token 20 from either the first neutral receptacle 54 or the second neutral receptacle 58, as appropriate, of the third member 50 of the neutral section 16 to the negative receptacle 88 of the fourth member 70 of the negative section 18. Placement of the first token 20 into the negative section 18 acts as a warning for the child that he or she is at risk for application of discipline. Preferably, the caregiver will also combine placement of the token 20 in the negative section 18 with an explanation of why the behavior is not acceptable and set forth the consequences to the child of continued unacceptable behavior. The caregiver will then continue to monitor the child's behavior. If the caregiver observes a second event of unacceptable behavior, then he or she will move second token 22 to the negative receptacle 88 of the negative section 18. At this time, the caregiver will verbally express disappointment with the child's unacceptable behavior and assign discipline that will take place then or later as a result of the child's second act of unacceptable behavior. The caregiver will then move the two tokens 20/22 back to the neutral receptacle 54 or 58 of the neutral section 16 to allow him or her to repeat the process as necessary and/or desirable. As with the above, of while the first token 20 is in the negative receptacle 88 of negative section 18 the child exhibits an event of positive/acceptable behavior, then the caregiver will move the token 20 from the negative receptacle 88 of negative section 18 to the positive receptacle 30 of the positive section 14, as shown on FIG. 15. As shown in FIG. 14, there may be times when one of the tokens 20/22 is in the positive section 14 and one of the tokens 20/22 is in the negative section 18 while the caregiver is continuing to monitor the child for further positive or negative behavior, at which time the one of the tokens 20/22 is moved to the other positive 14 or negative 18 section, as appropriate depending on the child's behavior.

The behavior modification device 10 and method 12 of the present invention allows a caregiver to more easily and timely reward and encourage acceptable behavior by a child and to discipline and discourage unacceptable behavior by the child. The device 10 of the present invention is configured to allow the child to easily understand and visualize the positive or negative effects of his or her good and bad behavior and to better appreciate the objective to be obtained by continuing to engage in good behavior. The device 10 and method 12 allows the child to readily grasp the caregiver's response to his or her behavior so that he or she may learn from that response, which will increase the likelihood that the child will continue good behavior and reduce the likelihood the child will repeat bad behavior. The device 10 and method 12 of the present invention allows a child's caregiver to encourage acceptable behavior and discourage unacceptable behavior in a fun and non-threatening manner.

While there are shown and described herein a specific form of the invention, it will be readily apparent to those skilled in the art that the invention is not so limited, but is susceptible to various modifications and rearrangements in design and materials without departing from the spirit and scope of the invention. In particular, it should be noted that the present invention is subject to various modifications with regard to any dimensional relationships set forth herein, with regard to its assembly, size, shape and use and with regard to the materials used in its construction. For instance, there are a number of components described herein that can be replaced with equivalent functioning components to accomplish the objectives of the present invention.

What is claimed is:

1. A behavior modification device for use by a caregiver to monitor and respond to the behavior of a child, said behavior modification device comprising:
   a positive section having a first member and a second member, one of said first member and said second member defining a positive receptacle, said positive receptacle sized and configured to receive and hold one or more tokens therein;
   a first connecting means for releasably connecting said first member and said second member together, said first connecting means configured to enclose said tokens in said positive receptacle when said first member is connected to said second member;
   a neutral section having a third member defining one or more neutral receptacles having an opening at least at one of a first end and a second end of said third member, said one or more neutral receptacles sized and configured to receive and hold said tokens and one or more reward items therein;
   a negative section having a fourth member and a fifth member, one of said fourth member and said fifth member defining a negative receptacle, said negative receptacle sized and configured to receive and hold said tokens therein;
   a fourth connecting means for releasably connecting said fourth member and said fifth member together, said fourth connecting means configured to enclose said tokens in said negative receptacle when said fourth member is connected to said fifth member,
   wherein said neutral section is disposed between and connected to each of said positive section and said negative section, at least one of said positive section and said negative section releasably connected to said neutral section so as to enclose said tokens and said reward items in at least one of said neutral receptacles.

2. The behavior modification device of claim 1, wherein said third member of said neutral section defines a first neutral receptacle at said first end of said third member and a second neutral receptacle at said second end of said third member, each of said first neutral receptacle and said second neutral receptacle having an opening and being sized configured to receive and hold said tokens and said reward items, said positive section releasably connected to said first end of said third member to selectively close said first neutral receptacle, said negative section releasably connected to said second end of said third member to selectively close said second neutral receptacle.

3. The behavior modification device of claim 1, wherein at least one of said first member and said second member is transparent.

4. The behavior modification device of claim 1, wherein at least one of said fourth member and said fifth member is transparent.

5. The behavior modification device of claim 4, wherein at least one of said first member and said second member is transparent.

6. The behavior modification device of claim 1, wherein said device is generally configured as a character.

7. The behavior modification device of claim 6, wherein said character is a bee.

8. The behavior modification device of claim 7 further comprising a smiley face at a first end of said first member and a tail at a second end of said fifth member.

9. The behavior modification device of claim 1, wherein said positive receptacle is defined by an opening in said second member, said first connecting means comprising an insert member at a second end of said first member, said insert member sized and configured to be tightly received in said opening of said positive receptacle so as to close said positive receptacle.

10. The behavior modification device of claim 1, wherein said negative receptacle is defined by an opening in said fourth member, said fourth connecting means comprising an insert member at a first end of said fifth member, said insert member sized and configured to be tightly received in said opening of said negative receptacle so as to close said negative receptacle.

11. A behavior modification device for use by a caregiver to monitor and respond to the behavior of a child, said behavior modification device comprising:
- a positive section having a first member and a second member, said second member defining a positive receptacle at a first end thereof with an opening associated with said positive receptacle, said positive receptacle sized and configured to receive and hold one or more tokens therein, said first member having a rearwardly disposed insert member sized and configured to tightly engage said opening of said positive receptacle and enclose said tokens in said positive receptacle when said first member is connected to said second member;
- a neutral section having a third member defining a first neutral receptacle at a first end of said third member and a second neutral receptacle at a second end of said third member, each of said first neutral receptacle and said second neutral receptacle having an opening associated therewith each of said first neutral receptacle and said second neutral receptacle sized and configured to receive and hold said tokens and/or one or more reward items therein, said first neutral receptacle releasably closed by a rearwardly disposed insert member at the second end of said second member sized and configured to tightly engage said opening of said first neutral receptacle when said second end of said second member is connected to said first end of said third member; and
- a negative section having a fourth member and a fifth member, said fourth member having a forwardly disposed insert member at a first end thereof sized and configured to tightly engage said opening of said second neutral receptacle and enclose said tokens and/or said reward items in said second neutral receptacle when said fourth member is connected to said third member, said fourth member defining a negative receptacle at a second end thereof with an opening associated with said negative receptacle, said negative receptacle sized and configured to receive and hold said tokens therein, said fifth member having a forwardly disposed insert member sized and configured to tightly engage said opening of said negative receptacle and enclose said tokens in said negative receptacle when said fifth member is connected to said fourth member.

12. The behavior modification device of claim 11, wherein at least one of said first member and said second member is transparent and at least one of said fourth member and said fifth member is transparent.

13. The behavior modification device of claim 11, wherein said device is generally configured as a character.

14. The behavior modification device of claim 13, wherein said character is a bee.

15. The behavior modification device of claim 14 further comprising a smiley face at a first end of said first member and a tail at a second end of said fifth member.

16. The behavior modification device of claim 11, wherein said device is approximately three to five inches long and one to two inches in diameter.

* * * * *